(12) United States Patent  
Olaru (10) Patent No.: US 7,780,434 B2  
(45) Date of Patent: *Aug. 24, 2010

(54) NOZZLE FOR AN INJECTION MOLDING APPARATUS

(75) Inventor: George Olaru, Montreal (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/562,416

(22) Filed: Sep. 18, 2009

(65) Prior Publication Data

US 2010/0028481 A1    Feb. 4, 2010

Related U.S. Application Data

(63) Continuation of application No. 10/925,211, filed on Aug. 25, 2004, which is a continuation of application No. 10/262,982, filed on Oct. 3, 2002, now Pat. No. 6,921,257.

(60) Provisional application No. 60/356,170, filed on Feb. 14, 2002, provisional application No. 60/346,632, filed on Jan. 10, 2002, provisional application No. 60/330,540, filed on Oct. 24, 2001.

(30) Foreign Application Priority Data

Oct. 3, 2001    (CA) .................................... 2358148

(51) Int. Cl.  
B29C 45/20    (2006.01)

(52) U.S. Cl. .................................. 425/549; 264/328.15

(58) Field of Classification Search .................. 425/549; 264/328.15  
See application file for complete search history.

(56) References Cited

U.S. PATENT DOCUMENTS 2,865,050 A    12/1958    Strauss (Continued)

FOREIGN PATENT DOCUMENTS

CA    2082700    5/1994

(Continued)

OTHER PUBLICATIONS

U.S. Appl. No. 60/330,540, filed Oct. 24, 2001. [Husky Exhibit # 1003 / Mold Masters Exhibit # 2008].

(Continued)

*Primary Examiner*—Tim Heitbrink  
(74) *Attorney, Agent, or Firm*—McDonnell Boehnen Hulbert & Berghoff LLP (57) ABSTRACT

A nozzle for an injection molding apparatus is provided. The injection molding apparatus has a mold component that defines a mold cavity and a gate into the mold cavity. The nozzle includes a nozzle body, a heater, a tip, a tip retainer, and a nozzle seal piece. The nozzle body defines a nozzle body melt passage therethrough that is adapted to receive melt from a melt source. The heater is thermally connected to the nozzle body for heating melt in the nozzle body. The tip defines a tip melt passage therethrough that is downstream from the nozzle body melt passage, and that is adapted to be upstream from the gate. The tip retainer is removably connected with respect to the nozzle body. The nozzle seal piece is connected with respect to the nozzle body. The material of nozzle seal piece has a thermal conductivity that is less than at least one of the thermal conductivity of the material of the tip and the thermal conductivity of the material of the tip retainer.

25 Claims, 5 Drawing Sheets

U.S. PATENT DOCUMENTS

| | | |
|---|---|---|
| 3,488,810 A | 1/1970 | Gellert |
| 3,677,682 A | 7/1972 | Putkowski |
| 3,716,318 A | 2/1973 | Erik et al. |
| 3,741,704 A | 6/1973 | Beasley |
| 3,952,927 A | 4/1976 | Schaumburg et al. |
| 4,004,871 A | 1/1977 | Hardy |
| 4,010,903 A | 3/1977 | Sakuri et al. |
| 4,013,393 A | 3/1977 | Gellert |
| 4,043,740 A | 8/1977 | Gellert |
| 4,053,271 A | 10/1977 | Gellert |
| 4,173,448 A | 11/1979 | Rees et al. |
| 4,212,627 A | 7/1980 | Gellert |
| 4,268,240 A | 5/1981 | Rees et al. |
| 4,268,241 A | 5/1981 | Rees et al. |
| 4,279,588 A | 7/1981 | Gellert |
| 4,286,941 A | 9/1981 | Gellert |
| 4,306,852 A | 12/1981 | Mateev et al. |
| 4,312,630 A | 1/1982 | Travaglini |
| 4,318,686 A | 3/1982 | Morgan |
| 4,330,258 A | 5/1982 | Gellert |
| 4,368,028 A | 1/1983 | Grish et al. |
| 4,412,807 A | 11/1983 | York |
| 4,450,999 A | 5/1984 | Gellert |
| 4,517,453 A | 5/1985 | Tsutsumi |
| 4,622,001 A | 11/1986 | Bright et al. |
| 4,652,230 A | 3/1987 | Osuna-Diaz |
| 4,662,837 A | 5/1987 | Anderson |
| 4,663,811 A | 5/1987 | Gellert |
| 4,768,283 A | 9/1988 | Gellert |
| 4,768,945 A | 9/1988 | Schmidt et al. |
| 4,771,164 A | 9/1988 | Gellert |
| 4,781,572 A | 11/1988 | Boring |
| 4,787,836 A | 11/1988 | Osuna-Diaz et al. |
| 4,832,593 A | 5/1989 | Brown |
| 4,875,848 A | 10/1989 | Gellert |
| 4,902,218 A | 2/1990 | Leonard et al. |
| 4,911,636 A | 3/1990 | Gellert |
| 4,925,384 A | 5/1990 | Manner |
| 4,945,630 A | 8/1990 | Gellert |
| 4,950,154 A | 8/1990 | Moberg |
| 4,954,072 A | 9/1990 | Zimmerman |
| 4,981,431 A | 1/1991 | Schmidt |
| 5,015,170 A | 5/1991 | Gellert |
| 5,028,227 A | 7/1991 | Gellert et al. |
| 5,030,084 A | 7/1991 | Gellert et al. |
| 5,053,271 A | 10/1991 | Mori et al. |
| 5,067,893 A | 11/1991 | Osuna-Diaz |
| 5,135,377 A | 8/1992 | Gellert |
| 5,139,724 A | 8/1992 | Hofstetter et al. |
| 5,141,696 A | 8/1992 | Osuna-Diaz |
| 5,208,052 A | 5/1993 | Schmidt et al. |
| 5,208,228 A | 5/1993 | Ok et al. |
| 5,209,107 A | 5/1993 | Grudzien, Jr. et al. |
| 5,238,378 A | 8/1993 | Gellert |
| 5,254,305 A | 10/1993 | Fernandez et al. |
| 5,268,184 A | 12/1993 | Gellert |
| 5,269,677 A | 12/1993 | Gauler |
| 5,299,928 A | 4/1994 | Gellert |
| 5,308,953 A | 5/1994 | Grudzien, Jr. et al. |
| 5,324,191 A | 6/1994 | Schmidt |
| 5,334,008 A | 8/1994 | Gellert |
| 5,360,333 A | 11/1994 | Schmidt |
| 5,374,182 A | 12/1994 | Gessner |
| 5,421,716 A | 6/1995 | Gellert |
| 5,443,381 A | 8/1995 | Gellert |
| 5,474,439 A | 12/1995 | McGrevy |
| 5,492,467 A | 2/1996 | Hume et al. |
| 5,501,594 A | 3/1996 | Glozer et al. |
| 5,505,613 A | 4/1996 | Krummenacher |
| 5,518,393 A | 5/1996 | Gessner |
| 5,545,028 A | 8/1996 | Hume et al. |
| 5,554,395 A | 9/1996 | Hume et al. |
| 5,569,475 A | 10/1996 | Adas et al. |
| 5,652,003 A | 7/1997 | Gellert |
| 5,658,604 A | 8/1997 | Gellert et al. |
| 5,674,439 A | 10/1997 | Hume et al. |
| 5,686,122 A | 11/1997 | Huntington et al. |
| 5,695,793 A | 12/1997 | Bauer |
| 5,700,499 A | 12/1997 | Bauer |
| 5,707,667 A | 1/1998 | Galt et al. |
| 5,736,171 A | 4/1998 | McGrevy |
| 5,795,599 A | 8/1998 | Gellert |
| 5,804,228 A | 9/1998 | Kofsman et al. |
| 5,811,140 A | 9/1998 | Manner |
| 5,820,899 A | 10/1998 | Gellert et al. |
| 5,834,041 A | 11/1998 | Sekine et al. |
| 5,845,853 A | 12/1998 | Friedman |
| 5,849,343 A | 12/1998 | Gellert et al. |
| 5,871,785 A | 2/1999 | Van Boekel |
| 5,871,786 A | 2/1999 | Hume et al. |
| 5,879,727 A | 3/1999 | Puri |
| 5,885,628 A | 3/1999 | Swenson et al. |
| 5,894,025 A | 4/1999 | Lee et al. |
| 5,895,669 A | 4/1999 | Seres, Jr. et al. |
| 5,925,386 A | 7/1999 | Moberg |
| 5,941,637 A | 8/1999 | Maurer |
| 5,948,448 A | 9/1999 | Schmidt |
| 5,948,450 A | 9/1999 | Swenson et al. |
| 5,955,121 A | 9/1999 | Gellert et al. |
| 5,980,234 A | 11/1999 | Harley |
| 5,980,237 A | 11/1999 | Swenson et al. |
| 5,984,661 A | 11/1999 | Vorkoper |
| 6,003,182 A | 12/1999 | Song |
| 6,009,616 A | 1/2000 | Gellert |
| 6,017,209 A | 1/2000 | Gellert et al. |
| 6,022,210 A | 2/2000 | Gunther |
| 6,030,202 A | 2/2000 | Gellert et al. |
| 6,036,467 A | 3/2000 | Jameson |
| 6,050,806 A | 4/2000 | Ko |
| 6,074,195 A | 6/2000 | Belous |
| 6,089,468 A | 7/2000 | Bouti |
| 6,113,381 A | 9/2000 | Gellert et al. |
| 6,135,757 A | 10/2000 | Jenko |
| 6,143,358 A | 11/2000 | Singh et al. |
| 6,164,954 A | 12/2000 | Mortazavi et al. |
| 6,220,851 B1 | 4/2001 | Jenko |
| 6,227,461 B1 | 5/2001 | Schroeder et al. |
| 6,234,783 B1 | 5/2001 | Shibata et al. |
| 6,245,278 B1 | 6/2001 | Lausenhammer et al. |
| 6,254,377 B1 | 7/2001 | Kazmer et al. |
| 6,261,084 B1 | 7/2001 | Schmidt |
| 6,264,460 B1 | 7/2001 | Wright et al. |
| 6,273,706 B1 | 8/2001 | Gunther |
| 6,287,107 B1 | 9/2001 | Kazmer et al. |
| 6,302,680 B1 | 10/2001 | Gellert et al. |
| 6,305,923 B1 | 10/2001 | Godwin et al. |
| 6,309,208 B1 | 10/2001 | Kazmer et al. |
| 6,315,549 B1 | 11/2001 | Jenko et al. |
| 6,318,990 B1 | 11/2001 | Gellert et al. |
| 6,331,106 B1 | 12/2001 | Helldin |
| 6,358,038 B1 | 3/2002 | Rozenberg |
| 6,358,039 B1 | 3/2002 | Manner et al. |
| 6,394,785 B1 | 5/2002 | Ciccone |
| 6,419,116 B1 | 7/2002 | Eigler et al. |
| 6,428,305 B2 | 8/2002 | Jenko |
| 6,533,571 B2 | 3/2003 | Fikani |
| 6,609,902 B1 | 8/2003 | Blais et al. |
| 6,709,262 B2 | 3/2004 | Fong |
| 6,726,467 B1 | 4/2004 | Lefebure |
| 6,769,901 B2 | 8/2004 | Babin et al. |
| 6,789,745 B1 | 9/2004 | Babin et al. |
| 6,821,112 B2 | 11/2004 | Eigler et al. |
| 6,832,909 B2 | 12/2004 | Bazzo et al. |
| 6,869,276 B2 | 3/2005 | Babin et al. |

| | | | |
|---|---|---|---|
| 6,921,257 B2 | 7/2005 | Olaru | |
| 6,921,259 B2 | 7/2005 | Sicilia et al. | |
| 6,962,492 B2 | 11/2005 | Olaru | |
| 6,971,869 B2 | 12/2005 | Olaru | |
| 6,988,883 B2 | 1/2006 | Babin et al. | |
| 7,108,503 B2 | 9/2006 | Olaru | |
| 7,128,566 B2 | 10/2006 | Babin | |
| 7,137,807 B2 | 11/2006 | Babin et al. | |
| 7,143,496 B2 | 12/2006 | Guenther | |
| 7,179,081 B2 | 2/2007 | Sicilia et al. | |
| 7,182,591 B2 | 2/2007 | Babin | |
| 7,201,335 B2 | 4/2007 | Babin et al. | |
| 7,344,372 B2 | 3/2008 | Fairy | |
| 7,364,425 B2 | 4/2008 | Fairy | |
| 2003/0008034 A1 | 1/2003 | Niewels | |
| 2003/0082264 A1 | 5/2003 | Babin et al. | |
| 2003/0086997 A1 | 5/2003 | Olaru | |
| 2003/0170340 A1 | 9/2003 | Sicilia et al. | |
| 2003/0235638 A1 | 12/2003 | Gellert | |
| 2004/0058031 A1 | 3/2004 | Niewels | |
| 2004/0071817 A1 | 4/2004 | Fischer et al. | |
| 2004/0131721 A1 | 7/2004 | Babin et al. | |
| 2004/0137107 A1 | 7/2004 | Babin et al. | |
| 2004/0146598 A1 | 7/2004 | Sicilia et al. | |
| 2004/0208949 A1 | 10/2004 | Niewels | |
| 2004/0258788 A1 | 12/2004 | Olaru | |
| 2004/0265417 A1 | 12/2004 | Olaru | |
| 2005/0106283 A1 | 5/2005 | Olaru | |
| 2005/0118298 A1 | 6/2005 | Babin et al. | |
| 2005/0136151 A1 | 6/2005 | Babin | |
| 2005/0214403 A1 | 9/2005 | Olaru | |

FOREIGN PATENT DOCUMENTS

| | | | |
|---|---|---|---|
| CA | 2190569 | | 5/1998 |
| CA | 2261367 | | 8/2000 |
| CA | 2332062 | | 7/2002 |
| CA | 2358148 | | 3/2003 |
| CA | 2358148 | | 4/2003 |
| CA | 2473920 | | 8/2003 |
| DE | 032 45 571 | A1 | 6/1984 |
| DE | 296 02 484 | U1 | 5/1996 |
| DE | 196 08 676 | C1 | 1/1997 |
| DE | 100 08 722 | A1 | 8/2001 |
| DE | 10037739 | A1 | 2/2002 |
| EP | 0 590 677 | A1 | 4/1994 |
| EP | 0 638 407 | A1 | 2/1995 |
| EP | 0743158 | | 11/1996 |
| EP | 0 750 975 | A1 | 1/1997 |
| EP | 0835176 | B1 | 4/1998 |
| EP | 0 873 841 | A2 | 10/1998 |
| EP | 0920969 | A1 | 6/1999 |
| EP | 0743158 | B1 | 8/1999 |
| EP | 0 962 296 | A2 | 12/1999 |
| EP | 1 188 537 | A2 | 3/2002 |
| EP | 1321274 | A1 | 6/2003 |
| FR | 2537497 | | 6/1984 |
| GB | 1 540 698 | | 2/1979 |
| JP | 05-261770 | | 10/1992 |
| JP | 05-177664 | | 7/1993 |
| JP | 05-309695 | | 11/1993 |
| JP | 6-143358 | | 5/1994 |
| JP | 7-148786 | | 6/1995 |
| JP | 8-090598 | | 4/1996 |
| JP | 9-123222 | | 5/1997 |
| JP | 10-034708 | | 2/1998 |
| JP | 10-264222 | | 10/1998 |
| JP | 10-296798 | | 11/1998 |
| JP | 11-254488 | | 9/1999 |
| JP | 2002-273768 | | 9/2002 |
| JP | 2002-307492 | | 10/2002 |
| JP | 2003-011173 | | 1/2003 |
| JP | 2003-011174 | | 1/2003 |
| JP | 2003-011176 | | 1/2003 |
| JP | 2003-071873 | | 3/2003 |
| WO | WO 84/00922 | | 3/1984 |
| WO | WO 97/02129 | A1 | 1/1997 |
| WO | WO 00/48814 | A1 | 8/2000 |
| WO | WO 01/28750 | | 4/2001 |
| WO | WO 01/28750 | A1 | 4/2001 |
| WO | WO 01/78961 | A1 | 10/2001 |
| WO | WO 02/40245 | A1 | 5/2002 |
| WO | WO 03/004243 | A1 | 1/2003 |
| WO | WO 03/028973 | A1 | 4/2003 |
| WO | WO 03/028974 | | 4/2003 |
| WO | WO 03/070446 | A1 | 8/2003 |
| WO | WO 03/028973 | | 10/2003 |
| WO | WO 03/086734 | A1 | 10/2003 |
| WO | WO 2004/012923 | A2 | 2/2004 |
| WO | WO 2005/090051 | A1 | 9/2005 |

OTHER PUBLICATIONS

U.S. Appl. No. 60/346,632, filed Jan. 10, 2002. [Husky Exhibit # 1004 / Mold Masters Exhibit # 2007].
U.S. Appl. No. 60/356,170, filed Feb. 14, 2002. [Husky Exhibit # 1005 / Mold Masters Exhibit # 2006].
Office Action dated Jan. 31, 2006 issued by the Examiner during prosecution of the Olaru '211 Application. [Husky Exhibit # 1013].
Office Action dated May 3, 2005 issued by the Examiner during prosecution of the Olaru '211 Application. [Husky Exhibit # 1017].
Office Communication dated Sep. 5, 2006 issued by the Examiner during prosecution of the Olaru '211 Application. [Husky Exhibit # 1019].
Preliminary Amendment submitted with the Olaru '211 Application on Aug. 25, 2004. [Husky Exhibit # 1011].
Amendment and Reply Under 37 C.F.R. §1.111, dated Jul. 31, 2006, submitted during prosecution of the Olaru '211 Application, including substitute specification submitted therewith. [Husky Exhibit # 1014].
Amendment and Reply Under 37 C.F.R. §1.111, dated Nov. 3, 2005, submitted during prosecution of the Olaru '211 Application. [Husky Exhibit # 1018].
Mold-Masters Identification of Support for the Claims, filed Feb. 26, 2007, Paper No. 18. [Husky Exhibit # 1020 / Mold Masters Exhibit # 2008].
Webster's II New Riverside Dictionary, Revised Edition, pp. 630-631 (1996). [Husky Exhibit # 1021].
Old rule 37 C.F.R. §1.633(a). [Husky Exhibit # 1007].
37 C.F.R. §1.57(a). [Husky Exhibit # 1015].
Unpatentable Olaru Claims Chart. [Husky Exhibit # 1024].
69 FR 56540. [Husky Exhibit # 1026].
M.P.E.P. § 608.01(q). [Husky Exhibit # 1027].
Mold-Master's Brochure Indicating Thermal Conductivities of Various Metals [Husky Exhibit # 1022].
Examiner Interview Summary Record of Feb. 21, 2006. [Husky Exhibit # 1051].
Application Data Sheet from U.S. Appl. No. 10/925,211. [Mold-Masters Exhibit # 2003].
Substitute Spec. for U.S. Appl. No. 10/925,211, filed Jul. 31, 2006. [Mold-Masters Exhibit # 2004].
Declaration of Harold Godwin of Jun. 13, 2007. [Mold-Masters Exhibit # 2011].
Declaration of Harold Godwin of Jun. 12, 2007. [Mold-Masters Exhibit # 2015].
Invention Disclosure Document. [Mold-Masters Exhibit # 2016].
Mold-Master's Clean Claims. [Mold-Masters Exhibit # 2018].
Search of the PTO patent database. [Mold-Masters Exhibit # 2030].
IDS from 6,609,902 prosecution history filed Nov. 12, 2002. [Mold-Masters Exhibit # 2035].
Figures drawn on by Dr. Malloy. [Mold-Masters Exhibit # 2037].
Blais 6,609,902 File History. [Mold-Masters Exhibit # 2027].
USPTO May 3, 2007 Memorandum re: KSR decision. [Husky Exhibit # 1071].
Machine Translation from PAJ Website for JP-06-143358, published May 24, 1994.

C.V. of Dr. Robert Malloy. [Husky Exhibit # 1010 / Mold-Masters Exhibit # 2019].
Mold-Masters Substantive Motion 2. [Husky Exhibit # 1056].
Mold-Masters Substantive Motion 1. [Husky Exhibit # 1057].
Mold-Masters Substantive Motion 3. [Husky Exhibit # 1060].
Mold-Masters Substantive Motion 4. [Husky Exhibit # 1061].
Transcript of Aug. 10, 2007 Deposition of Harold Godwin. [Husky Exhibit # 1063].
Order-Miscellaneous Bd. Rule 104, Aug. 1, 2007, Paper 47. [Husky Exhibit # 1072].
Order-Miscellaneous Bd. Rule 104, Apr. 6, 2007, Paper 24. [Husky Exhibit # 1081 / Mold-Masters Exhibit # 2034].
Husky's Second Declaration of Dr. Robert Malloy (Sep. 7, 2007). [Husky Exhibit # 1062].
Husky's First Declaration of Dr. Robert Malloy. [Husky Exhibit # 1009].
Transcript of Aug. 24, 2007 Deposition of Robert Malloy, Ph.D. [Husky Exhibit # 1086].
Transcript of Oct. 5, 2007 Deposition of Robert Malloy, Ph.D. [Husky Exhibit # 1087 / Mold-Masters Exhibit # 2041].
Declaration of Intereference mailed Jan. 31, 2007 (Paper 1). [Mold-Masters Exhibit # 2010].
Miscellaneous Order dated Apr. 6, 2007 (Paper 24). [Mold-Masters Exhibit # 2014].
Husky Substantive Motion No. 3. [Mold-Masters Exhibit # 2017].
Notice of Deposition of Dr. Robert Malloy. [Mold-Masters Exhibit # 2018A].
Handwritten Equation by Dr. Robert Malloy. [Mold-Masters Exhibit # 2028].
Mold-Masters List of Preliminary Motions filed Mar. 28, 2007. [Mold-Masters Exhibit # 2042].
Transcript from Jul. 17, 2007 Conference Call. [Mold-Masters Exhibit # 2043].
Email from Rhonda Goslinski to Paul Wormser dated Aug. 8, 2007. [Mold-Masters Exhibit # 2044].
Letter from Paula Wormser to Tony Asseiro dated Jan. 30, 2006. [Mold-Masters Exhibit # 2045].
Letter from Grantland Drutchas to Paul Wormser dated Feb. 1, 2006. [Mold-Masters Exhibit # 2046].
Vol. 4 Engineered Materials Handbook. [Husky Exhibit # 1085].
1991 Materials Selector (Excerpt). [Husky Exhibit # 1055].
Pages from "Materials Engineering". [Mold-Masters Exhibit # 2012].
Brush Wellman Website Page. [Mold-Masters Exhibit # 2036].
MatWeb—Tungsten, W. [Mold-Masters Exhibit # 2038].
MatWeb—Cobalt, Co. [Mold-Masters Exhibit # 2039].
MatWeb—Goodfellow Tungsten Carbide / Cobalt. [Mold-Masters Exhibit # 2040].
Chapter 5 of "Materials Engineering". [Mold-Masters Exhibit # 2025].
Plastic Part Design for Injection Molding, Dr. Robert A. Malloy, p. 313. [Mold-Masters Exhibit # 2022].
Brush Wellman Catalogue Served 2024 "Plastic Part Design for Injection Molding," Dr. Robert A. Malloy, p. 12. [Mold-Masters Exhibit # 2023].
"Plastic Part Design for Injection Molding," Dr. Robert A. Malloy, p. 12. [Mold-Masters Exhibit # 2024].
"Plastic Part Design for Injection Molding,"Dr. Robert A. Malloy, p. 309 [Mold-Masters Exhibit # 2029].
Biography Listing for Dennis D. Crouch, formerly "Of Counsel" with McDonnell Boehnen Hulbert & Berghoff L.L.P., which is found on http://patentlaw.typepad.com/about.html. [Husky Exhibit # 1028].
Mold-Masters Opposition to Motion 3 dated Sep. 7, 2007.
Mold-Masters Opposition to Motion 2 dated Sep. 7, 2007.
Mold-Masters Opposition to Motion 1 dated Sep. 7, 2007.
Mold-Masters Responsive Motion to Cancel Claim 40 from MML's Present Application dated Jul. 24, 2007.
Husky Contingent Substantive Motion 4 dated Jun. 13, 2007.
Judgment dated Jan. 28, 2009.
Redeclaration dated Aug. 14, 2008.
Decision on Interlcocutory Motions dated Aug. 14, 2008.
Mold-Masters List of Exhibits.
Husky List of Exhibits.
Husky Reply 4 dated Oct. 10, 2007.
Husky Reply 3 dated Oct. 10, 2007.
Husky Reply 2 dated Oct. 10, 2007.
Husky Reply 1 dated Oct. 10, 2007.
Mold-Masters Reply No. 4 dated Oct. 10, 2007.
Mold-Masters Reply No. 3 dated Oct. 10, 2007.
Mold-Masters Reply No. 2 dated Oct. 10, 2007.
Mold-Masters Reply No. 1 dated Oct. 10, 2007.
Mold-Masters Reply for Motion re Claim 40 dated Oct. 10, 2007.
Husky Opposition to Mold Masters Responsive Motion re Claim 40 dated Sep. 10, 2007.
Husky Opposition 4 dated Sep. 7, 2007.
Husky Opposition 3 dated Sep. 7, 2007.
Husky Opposition 2 dated Sep. 7, 2007.
Husky Opposition 1 dated Sep. 7, 2007.
Mold-Masters Opposition to Motion 4 dated Sep. 7, 2007.
Husky Substantive Motion 1 dated Jun. 13, 2007.
Husky Substantive Motion 2 dated Jun. 13, 2007.
Mold-Masters Priority Statement dated Jun. 13, 2007.
Husky's Identification of Prior Art dated.
Mold-Masters List of Prior Art with Prior Art.
Husky Priority Statement dated Jun. 13, 2007.
Riedel, Ralf, "Handbook of Ceramic Hard Materials", Wiley VCH, Weiheim, Germany, Table 1, p. 965-995 (2000). [Husky Exhibit # 1052].
"AerMet-for-Tooling" and "AerMet 100" Data Sheets, Carpenter Technology Corporation Wyomissing, PA. http://www.cartech.com. [Husky Exhibit # 1050].
Technical Bulletin, "QC-7 Mold Plate ACRP-171-E",Alcoa Mill Products, Inc. Bettendorf, Iowa. [Husky Exhibit # 1049].
www.matweb.com [Husky Exhibit # 1048].
Blog of Gheorghe Olaru, dated May 18, 2006, found on Patently O® patent blog website of Dennis D. Crouch, formerly "Of Counsel" with McDonnell Boehnen Hulbert & Berghoff L.L.P., dated May 18, 2006, http://www.patentlyo.com/ patent/2006/05/professor_kimbe.html. [Husky Exhibit # 1029].
"Tech firms to lobby for patent litigation reform", Lomabardi, Candance, CNET News.com, published May 11, 2006, 1:22 PM PDT on http://news.com.com/Tech+firms+to+lobby+for+patent+litigation+reform/2100-1014_3-6071321.html [Husky Exhibit # 1030].
ASTM C17000 specification standards for a beryllium copper alloy found at http://www.avins.com/HP-Alloys/cube1.7_c170.htm that is published by Avins Industrial Products, 2 North Road, Warren, New Jersey 07059. [Husky Exhibit # 1031].
Definition of the term "alloy" from the Merriam-Webster Online Dictionary, 2005, published by Merriam-Webster, Incorporated. [Husky Exhibit # 1032].
Technical literature, "Crucible Tool Steel and Specialty Alloy Selector", Crucible Materials Corp (1996). [Husky Exhibit # 1033].
Menges, Georg and Mohren, Paul; "How to Make Injection Molds", Carl Hanser Verlag, Munich (1986). [Husky Exhibit # 1034].
Anonymous, "Injection Molding Reference Guide (4th Edition)", Advanced Process Engineering (1997). [Husky Exhibit # 1035].
Davis, J. R., "Stainless Steels", ASM International Handbook Committee, Materials Park, OH (1994). [Husky Exhibit # 1036].
Smithells, Colin J., "Smithells Metals Reference Book.—7th ed.", Butterworh-Heinemann Ltd, Linacre House, Jordan Hill, Oxford OX2 8DP (1992). [Husky Exhibit # 1037].
Technical Bulletin, (www.moldsteel.com/nak80.htm), "NAK 80 Properties", International Mold Steel, Inc. (copyright 2000-2007). [Husky Exhibit # 1038].
Technical Bulletin, (www.moldsteel.com/nak55.htm), "NAK55 Properties", International Mold Steel, Inc. (copyright 2000-2007). [Husky Exhibit # 1039].
Technical Bulletin, (www.moldsteel.com/nak55.htm), "Premium H-13 Properties", International Mold Steel, Inc. (copyright 2000-2007). [Husky Exhibit # 1040].
Technical Bulletin, "Crucible CPM 10V (AISI A11) Issue #7", Crucible Service Centers, Camillus, NY (Nov. 2003). [Husky Exhibit # 1041].

ASM International Handbook Committee, "ASM Metals Handbook", ASM International, USA (1990). [Husky Exhibit # 1042].

Woldman, Norman Emme, "Woldman's Engineering Alloys", ASM International, Materials Park, OH (1994). [Husky Exhibit # 1043].

Technical Bulletin (www.goodfellow.com/scp/active/STATIC/A/Molybdenum_High_Temperature_Alloy...), "Molybdenum High Temperature Alloy TZM—Material Information Mo99/Ti 0.5/Zr 0.1", Goodfellow, England. [Husky Exhibit # 1044].

ASM International Handbook Committee, "ASM Metals Handbook—vol. 2", 13. ASM International, USA, p. 301 and 395 (1979). [Husky Exhibit # 1045].

Technical Bulletin, "Materials used on standard Mold-Masters Dura systems", 15. Material Conductivity, Mold Masters Ltd. Canada (1997). [Husky Exhibit # 1046].

European Search Report for EP application 09006138.3 mailed Jun. 16, 2009.

CRC -Shackelford, James F. & Alexander, W., "Thermal Properties of Materials", Materials Science and Engineering Handbook, Boca Raton: CRC Press LLC (2001). [Husky Exhibit # 1047].

Ewikon, Instruction Manual for Ewikon Hotrunner Systems.

Husky Injection Molding Systems, S.A., 750 Series.

Ewikon, Hotrunner Systems for Large Parts, pp. 2-11, May 2000.

Ewikon, Product Guide, "Internally Heated Hotrunner Systems," pp. 2-7, Oct. 2000.

Daniel Frenkler and Henry K. Zawistowski—RAPRA Technology Ltd., "Hot Runners in Injection Moulds," 2001.

Ewikon, HPS III-NV Valve Gate Systems, "All Advantages of the Valve Gate Technology in a Most Compact System," p. 209, Oct. 2001.

Ewikon, HPS IIII-VT Nozzles, 230 V Externally Heated, "For Multi-Cavity Applications and Close Cavity Spacing," pp. 2-7, Oct. 2001.

Redacted letter and attached figure addressed to Mold Masters Limited from the representative of Mr. Maurizio Bazzo dated Dec. 21, 2001.

Ewikon, HPS III Single Tips, 230 V Externally Heated, "HPS III-SE High Performance Single Tips, 230 V With Tip Sealing Technology," pp. 2-9, Mar. 2002.

Ewikon Product Catalog entitled, "AuBenbeheizte HeiBkanalduse, 230 V, fur schnelle Farbwechsel," 3 pgs., (Oct. 2000).

Ewikon, Hotrunner Systems for the Packaging and Medical Inustry, pp. 2-7 (Jun. 2001).

H.P. Manner, "NadelverschluBdusen fur kurze Zykluszeit," *Kunststoffe* 85(2):166-168 (1995).

Hydraulic Injection Molding Machinery, Cincinnati Milacron pamphlet (1984).

J.D. Robinson "Gating and Cooling Techniques for Polypropylene," Plastics, pp. 47-51 (1965).

Kona Corporation Catalog entitled, "Kona Bushing for Sprueless Molding," pp. 1-24 (Jun. 2001).

"Mold Hotrunner Solutions," Product Illustration of a Guided Mechanism (date unknown).

Press Release entitled "Mold-Masters Introduces the New Accu-Gate Virtually Eliminating Gate Wear," (Dec. 2002).

Redacted: Images and information from "Gunther Hot Runner Technology," taken from Gunther website (Aug. 2003).

PCT Search Report for PCT/CA03/01154, mailed Dec. 3, 2004.

PCT Search Report for WO 03/70446 (Appl. No. PCT/CA03/00244), mailed May 16, 2003.

NOZZLE FOR AN INJECTION MOLDING APPARATUS

CROSS REFERENCE TO RELATED APPLICATIONS

This application is a continuation of U.S. patent application Ser. No. 10/925,211 filed Aug. 25, 2004, entitled "Injection Molding Nozzle," which is a continuation of U.S. patent application Ser. No. 10/262,982, now U.S. Pat. No. 6,921,257, filed Oct. 3, 2002, entitled "Tip Assembly Having at Least Three Components for Hot Runner Nozzle," which claims the benefit under 35 U.S.C. §119(e) to U.S. Provisional Application No. 60/356,170, filed Feb. 14, 2002, and U.S. Provisional Application No. 60/346,632, filed Jan. 10, 2002, and U.S. Provisional Application No. 60/330,540, filed Oct. 24, 2001, which are all incorporated by reference herein in their entireties.

FIELD OF THE INVENTION

This invention relates to an injection molding machine, and more particularly to a nozzle tip for a nozzle in an injection molding machine.

BACKGROUND OF THE INVENTION

It is known for a nozzle in hot runner injection molding machines to include a thermally conductive body and a thermally conductive tip. Furthermore, it is known for the nozzle to include a separate tip retainer that joins to the nozzle body and retains the tip in the nozzle body. The tip retainer is also typically used to seal between the nozzle and the mold cavity plate to which the nozzle transfers melt. Because the mold cavity plate is usually cooler than the tip, the tip retainer is typically made from a material that is less thermally conductive than the tip itself.

An example of such a nozzle construction is shown in U.S. Pat. No. 5,299,928 (Gellert). By making the tip retainer out of a less thermally conductive material than that of the tip itself, the efficiency of the nozzle to transfer heat from the heater to the melt is reduced, sometimes significantly.

Thus a need exists for new nozzle constructions that have high heat transfer efficiency.

SUMMARY OF THE INVENTION

In a first aspect the invention is directed to a nozzle for an injection molding machine, comprising a nozzle body, a nozzle tip, a tip retainer, and a seal piece. The nozzle body has a body melt passage therethrough. The nozzle tip has a tip melt passage therethrough. The tip is connected to the body so that the tip melt passage is in communication with and downstream from the body melt passage. The tip is made from a thermally conductive and wear resistant material, such as for example Tungsten Carbide. The tip retainer is for retaining the tip on the body. The tip retainer is made from a thermally conductive material, such as for example Be—Cu (Beryllium-Copper), Beryllium-free Copper, TZM (Titanium Zirconium Molybdenum alloy), Aluminum, Molybdenum or suitable Molybdenum alloys. The seal piece is located adjacent the downstream end of the tip retainer for sealing against melt flow between the tip retainer and a mold cavity plate. The seal piece is made from a relatively less thermally conductive material.

DESCRIPTION OF THE DRAWINGS

For a better understanding of the present invention and to show more clearly how it may be carried into effect, reference will now be made by way of example to the accompanying drawings, showing articles made according to a preferred embodiment of the present invention, in which.

DESCRIPTION OF THE PREFERRED EMBODIMENT

Figure 1:
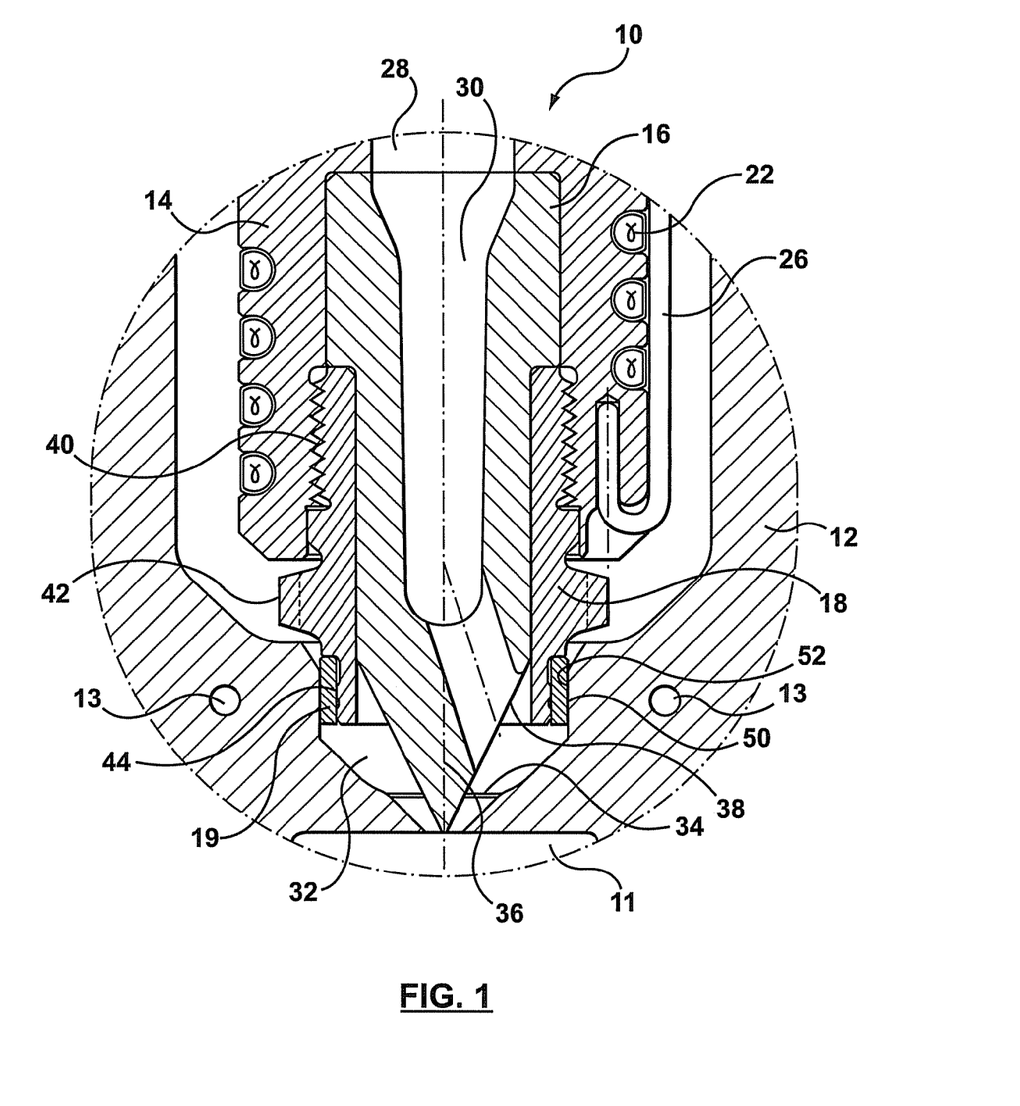
FIG. 1 is a sectional view of a portion of a nozzle in accordance with a first embodiment of the present invention.

Reference is made to FIG. 1, which shows a nozzle 10, accordance with a first embodiment of the present invention. Nozzle 10 is for transferring melt from a manifold in a hot runner injection molding machine to a mold cavity 11 in a mold cavity plate 12. Mold cavity cooling channels 13 may optionally be included in mold cavity plate 12. Nozzle 10 has a body 14, a tip 16, a nozzle tip retainer 18 and a nozzle seal piece 19. The body 14 includes a heater 22. Body 14 may also include a thermocouple 26. The body 14 has a melt passage 28 that passes therethrough.

The tip 16 may be removable from the body 14, or alternatively may be fixed to body 14. The tip 16 has a melt passage 30 therethrough that communicates with the body melt passage 28. The melt passage 30 may exit from tip 16 into a chamber 32 that surrounds nozzle tip 16. The chamber 32 ends at a gate 34, which opens into the mold cavity 11.

Melt passes from a melt source, through one or more manifold runners, through the nozzle body melt passage 28, through the tip melt passage 30, through the chamber 32, through the gate 34 and finally into mold cavity 11.

The centre of the gate 34 defines an axis 36, which is generally parallel to the direction of flow of melt through gate 34, into the mold cavity 11.

The exit from the tip melt passage into the chamber 32 is shown at 38. Exit 38 may be positioned off-centre from axis 36, as shown, or alternatively exit 38 may be concentric with respect to axis 36.

Because the melt flows through tip 16, the tip may be used to heat the melt and is therefore preferably made from a thermally conductive material, so that heat from the heater 22 is transferred to the melt flowing through the melt passage 30. Also, however, because of the melt flow through tip 16, the tip 16 is exposed to a highly abrasive environment, and is therefore also preferably made from a wear resistant material. An example of such a material that meets both these criteria is Tungsten Carbide. The applicant's U.S. Pat. No. 5,658,604 (Gellert et al.) discloses the construction of a nozzle tip using Tungsten Carbide, and is hereby incorporated by reference.

Because the tip is preferably made from a material such as Tungsten Carbide, it can be relatively difficult to machine a thread on it for removably fastening it to the body 14.

The tip retainer 18 holds the tip 16 in place in the nozzle body 14. The tip retainer 18 may be less wear resistant than the tip 16 because the tip retainer 18 does not have an internal melt passage. Accordingly, the tip retainer 18 may be made from a material which is relatively easily machined with threads 40.

The tip retainer 18 may be separable from the tip 16 or may be integrally joined with the tip 16. The tip retainer 18 may, for example, include a threaded portion 40 for mating with a corresponding threaded portion on the nozzle body 14, as shown. Alternatively the tip retainer 18 may include an internal thread to mate with an external thread on the nozzle body 14. Tip retainer 18 may also include a gripping portion 42, which may be hexagonal for receiving a removal tool, for removing tip retainer 18 from nozzle body 14.

The tip retainer 18 may alternatively be brazed to the tip 16. This way, the tip 16 is more easily removable from the body 14 of the nozzle 10, because the tip 16 is assured of being removed from the body 14 when the tip retainer 18 is removed.

The tip retainer 18 is at least in part, positioned between the melt passage 30 and the heater 22 along a significant portion of the length of the melt passage 30. Thus the tip retainer 18 is preferably made from a thermally conductive material. However, as explained above, the tip retainer 18 is not necessarily made from a wear resistant material. The tip retainer 18 may be made from such materials as Be—Cu (Beryllium-Copper), Beryllium-free Copper, TZM (Titanium Zirconium Molybdenum alloy), Aluminum, Molybdenum or suitable Molybdenum alloys, H13, mold steel or steel alloys, such as AerMet 100™.

A portion of the tip retainer 18 is exposed to the melt. As a result, tip retainer 18 has a sealing surface 44, which is the surface that receives the nozzle seal piece 19.

The nozzle seal piece 19 connects to the tip retainer 18 on the sealing surface 44. The nozzle seal piece 19 seals between the tip retainer 18 and the mold cavity plate 12, to inhibit melt leakage out from chamber 32, and may also serve to align the nozzle 10 in the bore 52 of the mold cavity plate 12. The nozzle seal piece 19 has an outer sealing surface 50 that provides a seal with the bore 52 of the mold cavity plate 12. This seal may be any suitable kind of seal, such as a mechanical seal. Outer surface 50 may optionally also serve as an alignment means for aligning nozzle 10 into the bore 52 of the mold cavity plate 12. The nozzle seal piece 19 is not positioned between the melt passage 30 and the heater 22, but is rather positioned between the melt passage and the mold cavity plate 12, which is typically cooler than the nozzle tip 16. Thus, the nozzle seal piece 19 is preferably made from a material that is comparatively less thermally conductive than the material of the nozzle tip 16, and that is generally equal to or less thermally conductive than the material of the tip retainer 18. For example, the nozzle seal piece 19 may be made from titanium, H13, stainless steel, mold steel or chrome steel. As another alternative, it may be made from ceramic. Other suitable materials for the seal piece 19 are disclosed in U.S. Pat. No. 5,879,727 (Puri), which is hereby incorporated by reference. Puri discloses such materials for use as an insulative layer for a nozzle.

The seal piece 19 may be a separate piece that is mechanically joined to tip retainer 18 by a suitable joint, such as an interference fit, as shown. Alternatively, the seal piece 19 may be made by spraying a coating onto the tip retainer 18, and then machining the coating down as required, to a suitable dimension for mating and sealing appropriately with mold cavity plate 12. U.S. Pat. No. 5,569,475 (Adas et al.) discloses the method of spraying on an insulating layer onto a portion of a nozzle, and is hereby incorporated by reference.

Figure 2:
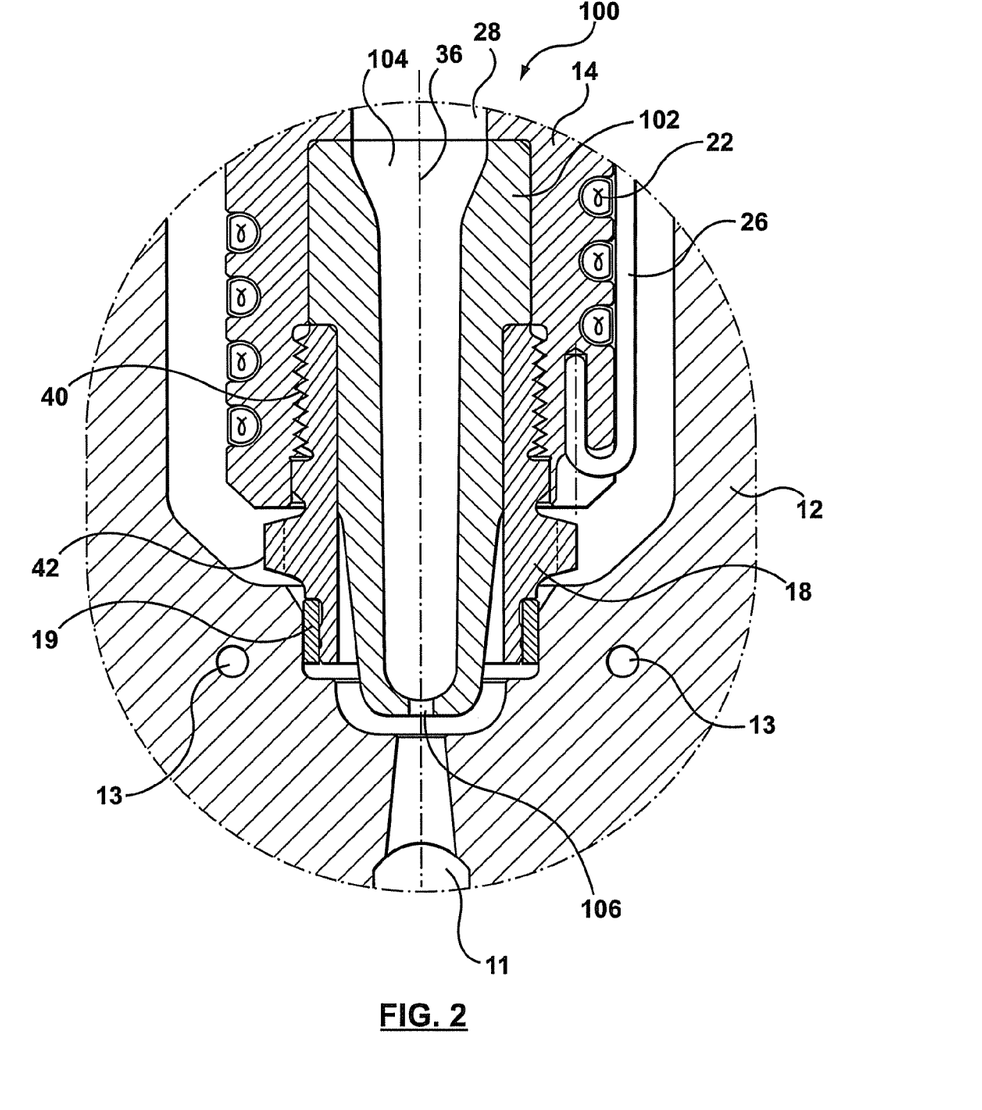
FIG. 2 is a sectional view of a portion of a nozzle in accordance with a second embodiment of the present invention.

Reference is made to FIG. 2, which shows a nozzle 100 in accordance with a second embodiment of the present invention that includes a tip 102. Tip 102 differs from tip 16 in that tip 102 has a melt passage 104 with an exit 106 that is concentric about the axis 36 of the gate 34.

Thus, a nozzle in accordance with the present invention may have a tip that inserts into the gate 34 and has an off-centre melt passage exit, or alternatively has a tip that has a concentric melt passage exit.

Figure 3:
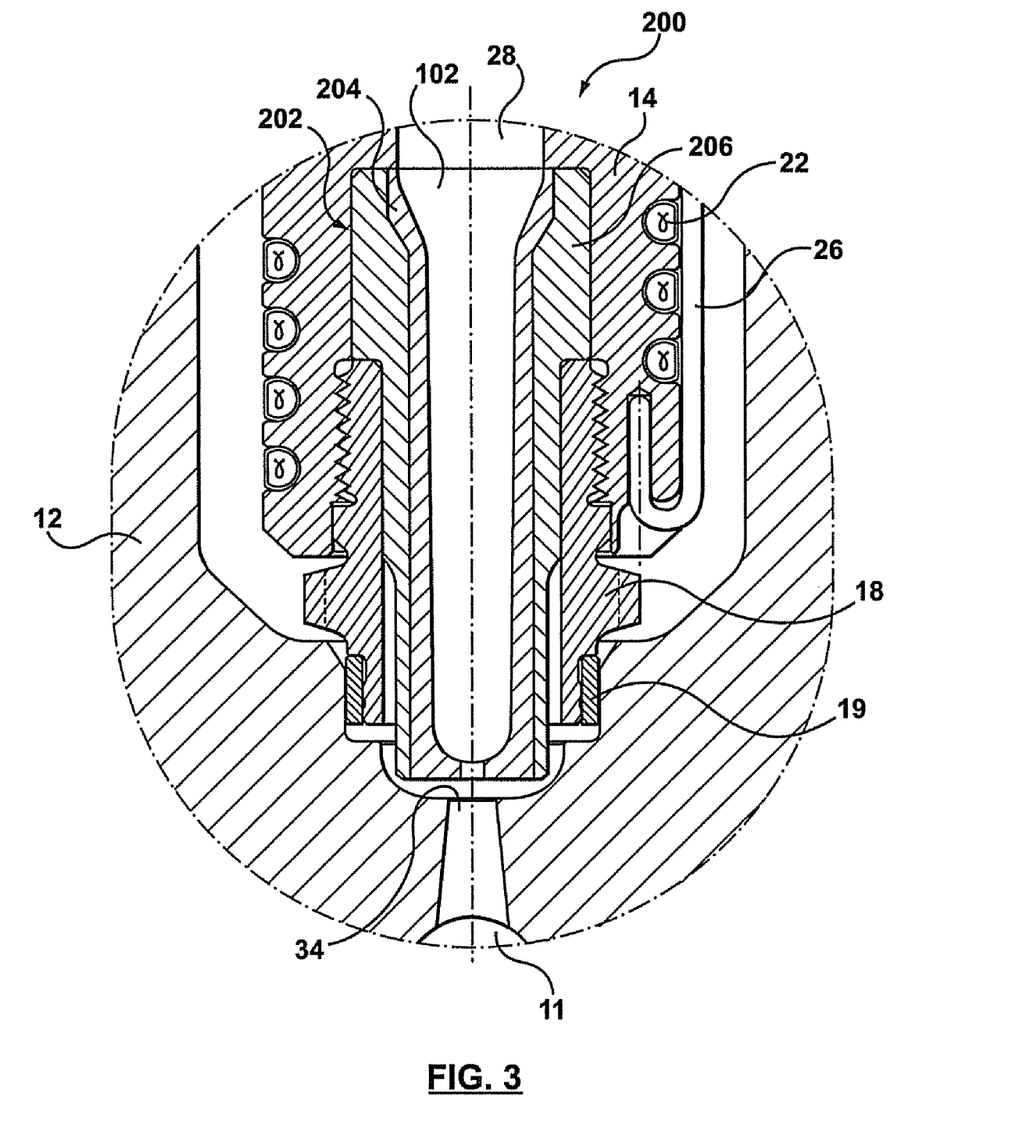
FIG. 3 is a sectional view of a portion of a nozzle in accordance with a third embodiment of the present invention

Reference is made to FIG. 3, which shows a nozzle 200 in accordance with a third embodiment of the present invention. Nozzle 200 is similar to nozzle 100, but includes a two-piece tip 202, instead of tip 102. Tip 202 includes an inner piece 204 and an outer piece 206. The inner piece 204 contains the melt passage 102 therethrough. Inner piece 204 may be made from a wear resistant material, and from a thermally conductive material. For example, inner piece 204 may be made from a material such as Tungsten Carbide. Outer piece 206 may be made from thermally conductive material, but is not required to be made from a material that is as wear resistant as the inner piece 206. For example, the outer piece 206 may be made from a material, such as Be—Cu (Beryllium-Copper), or Beryllium-free Copper or TZM (Titanium Zirconium Molybdenum alloy). The nozzle 200 also includes body 14, retainer 18 and seal piece 19.

Figure 4:
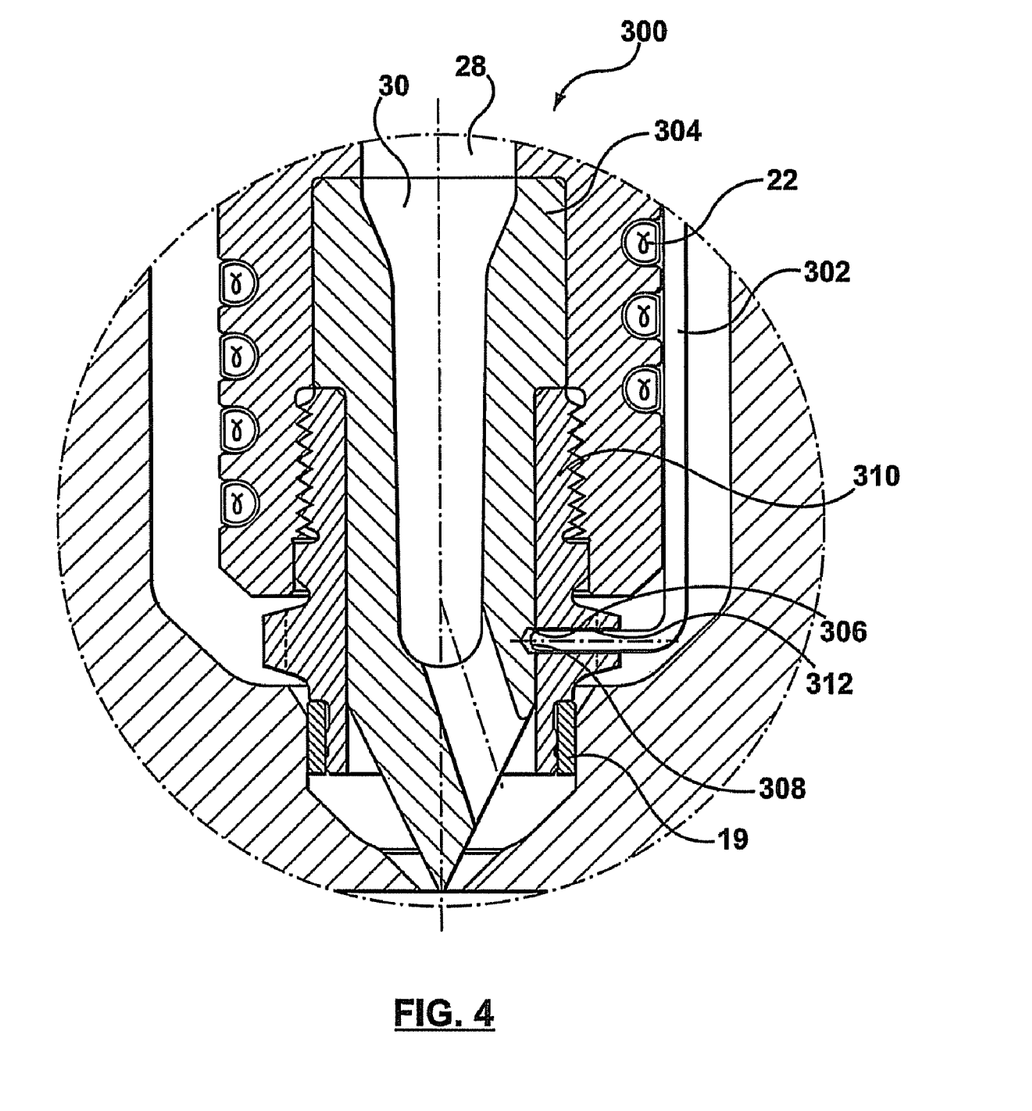
FIG. 4 is a sectional view of a portion of a nozzle in accordance with a fourth embodiment of the present invention.

Reference is made to FIG. 4, which shows a nozzle 300 in accordance with a fourth embodiment of the present invention. Nozzle 300 is similar to nozzle 10, except that nozzle 300 is configured to receive a thermocouple 302, within the nozzle tip 304, to get a more accurate temperature for the melt flowing therethrough. Nozzle tip 302 includes an aperture 306 for receiving the sensing portion 308 of thermocouple 302. Aperture 306 may be, for example, a hole sized to snugly receive thermocouple 302, to facilitate heat conduction from the tip 302 to the sensing portion 308. Nozzle retainer 310 includes pass-through 312, which may be, for example, a slotted hole, to permit the passage of the thermocouple 302 into the aperture 306.

Nozzle 300 includes seal piece 19 which mounts to retainer 310 in the same way it mounts to retainer 18.

Figure 5:
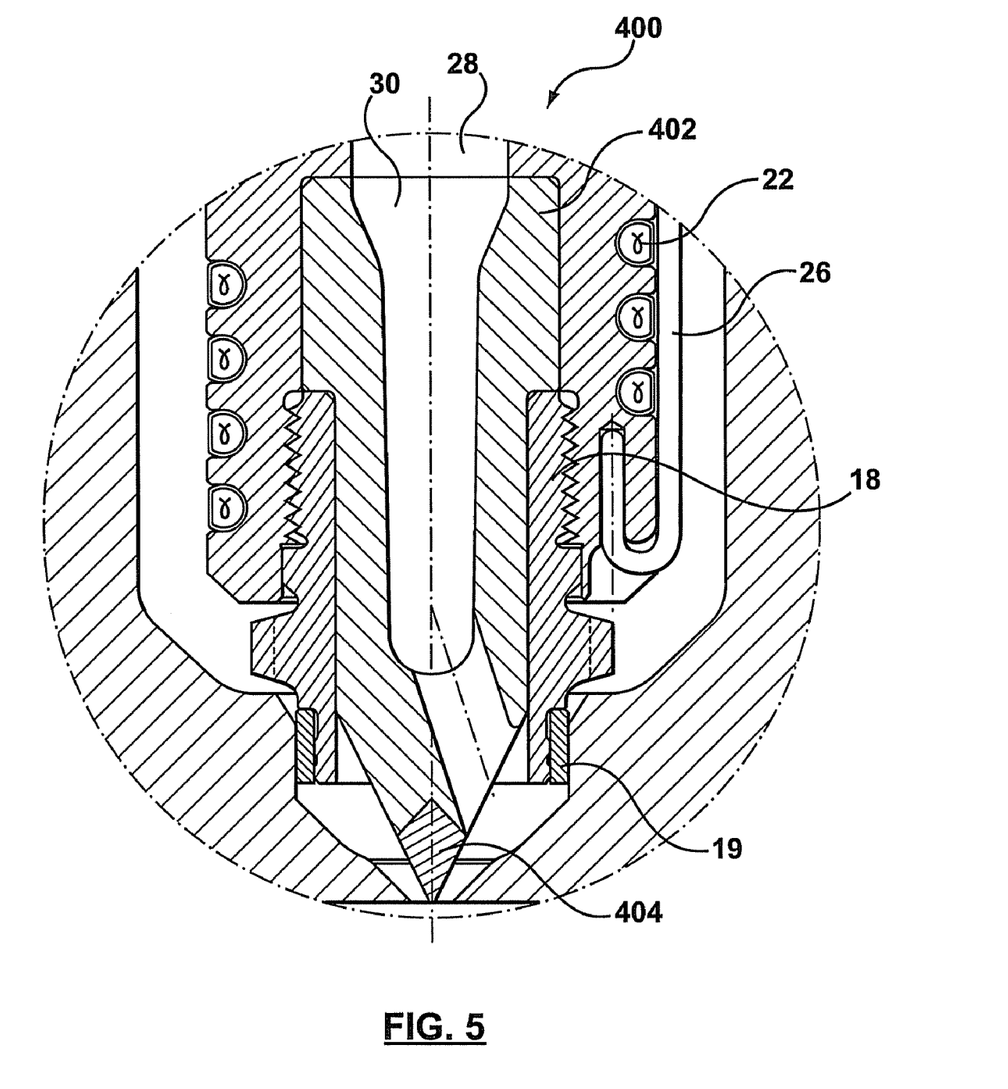
FIG. 5 is a sectional view of a portion of a nozzle in accordance with a fifth embodiment of the present invention.

Reference is made to FIG. 5, which shows a nozzle 400 in accordance with a fifth embodiment of the present invention. Nozzle 400 is similar to nozzle 10, except that nozzle 400 includes a tip 402 that is wear resistant, particularly at the end 404. End 404 is subject to increased wear from the melt flow for several reasons. The available cross-sectional area through which the melt can flow (i.e., the gate area minus the area of end 404) is relatively small and as a result the melt flow velocity through the gate area is relatively high. The higher melt flow velocity increases the wear on the end 404. Furthermore, the end 404 has a relatively high surface-to-volume ratio, relative to other portions of the tip 402 that are exposed to the melt flow, and is therefore, particularly susceptible to wear from the melt flow.

Tip 402 includes an end 404 that is mode from a wear resistant and thermally conductive material, such as tungsten carbide. The rest of the tip 402 may be made from a less wear resistant material, thermally conductive, such as Be—Cu. By making the tip 402 with the compound construction described above, it is wear resistant in the place where it is needed most, and may be less wear resistant where it is needed less.

Retainer 18 and seal piece 19 cooperate with tip 402 in a manner similar to how they cooperate with tip 16.

While the above description constitutes the preferred embodiments, it will be appreciated that the present invention is susceptible to modification and change without departing from the fair meaning of the accompanying claims.

The invention claimed is:

1. A nozzle for an injection molding apparatus, the injection molding apparatus having a mold component defining a mold gate and a mold cavity communicating with the mold gate, the nozzle comprising:
   a nozzle body, the nozzle body defining a nozzle body melt passage therethrough, wherein the nozzle body melt passage is downstream from and in fluid communication with a melt source, and the nozzle body melt passage is upstream from and in fluid communication with the mold gate into the mold cavity;
   a tip defining a tip melt passage therethrough, wherein the tip melt passage is downstream from and in fluid communication with the nozzle body melt passage, and the tip melt passage is adapted to be upstream from and in fluid communication with the mold gate;
   a tip retainer that is connected to the nozzle body;
   wherein the tip is made from a material which is more wear resistant then the tip retainer; and
   a nozzle seal piece located between the mold component and the tip retainer, wherein the material of the nozzle seal piece has a thermal conductivity that is less than the thermal conductivity of the material of the tip retainer.

2. A nozzle as claimed in claim 1, wherein the tip is removably connected to the nozzle body.

3. A nozzle as claimed in claim 1, wherein the tip is made from tungsten carbide.

4. A nozzle as claimed in claim 2, wherein the tip retainer has a tip retainer threaded portion and the nozzle body has a nozzle body threaded portion that is adapted to mate with the tip retainer threaded portion.

5. A nozzle as claimed in claim 1, wherein the tip retainer is made from beryllium copper or beryllium free copper alloy.

6. A nozzle as claimed in claim 1, wherein the tip retainer is made from one of TZM, molybdenum or suitable molybdenum alloys, H13, mold steel, or steel alloys.

7. A nozzle as claimed in claim 1, wherein the nozzle seal piece is connected to the tip retainer.

8. A nozzle as claimed in claim 1, wherein the nozzle seal piece is adapted to align the nozzle with respect to the mold gate.

9. A nozzle as claimed in claim 1, wherein the nozzle seal piece is adapted to inhibit leakage of melt from a chamber that is formed between the tip and the mold gate.

10. A nozzle as claimed in claim 1, wherein the nozzle seal piece is made from steel, titanium or ceramic.

11. An injection molding apparatus comprising:
    a manifold runner component;
    a mold component, the mold component defining a mold cavity and a mold gate into the mold cavity; and
    at least one nozzle, the nozzle comprising:
       a nozzle body, the nozzle body defining a nozzle body melt passage therethrough, wherein the nozzle body melt passage is downstream from and in fluid communication with a melt source, and the nozzle body melt passage is upstream from and in fluid communication with the mold gate into the mold cavity;
       a tip defining a tip melt passage therethrough, wherein the tip melt passage is downstream from and in fluid communication with the nozzle body melt passage, and the tip melt passage is adapted to be upstream from and in fluid communication with the mold gate;
       a tip retainer that is connected to the nozzle body and removably retains the tip to the nozzle body;
       wherein the tip is separable from the tip retainer and is made from a material which is more wear resistant then the tip retainer; and
       a nozzle seal piece located between the mold component and the tip retainer, wherein the material of the nozzle seal piece has a thermal conductivity that is less than the thermal conductivity of the material of the tip retainer;
    wherein the manifold runner component defines at least one runner, and the at least one runner is adapted to receive melt from a melt source.

12. An injection molding apparatus as claimed in claim 11, wherein the tip retainer has a tip retainer threaded portion and the nozzle body has a nozzle body threaded portion that is adapted to mate with the tip retainer threaded portion.

13. An injection molding apparatus as claimed in claim 12, wherein the nozzle seal piece forms a seal between the tip retainer and the mold component.

14. An injection molding apparatus as claimed in claim 12, wherein the nozzle seal piece forms a seal between the nozzle body and the mold component.

15. An injection molding apparatus as claimed in claim 12, wherein the nozzle seal piece forms a seal between the tip and the mold component.

16. An injection molding apparatus as claimed in claim 13, wherein the tip is made from tungsten carbide.

17. An injection molding apparatus as claimed in claim 16, wherein the tip retainer is made from beryllium copper or beryllium free copper alloy.

18. An injection molding apparatus as claimed in claim 13, wherein the tip retainer is made from beryllium copper or beryllium free copper alloy.

19. An injection molding apparatus as claimed in claim 13, wherein the nozzle seal piece is connected to the tip retainer.

20. An injection molding apparatus as claimed in claim 13, wherein the tip retainer is made from one of TZM, molybdenum or suitable molybdenum alloys, H13, mold steel, or steel alloys.

21. Components for a hot runner nozzle comprising in combination:
    a nozzle tip having a melt channel; and
    a tip retainer that is designed to removably retain the nozzle tip in the hot runner nozzle;
    wherein the nozzle tip is separable from the tip retainer and is made from a material which is more wear resistant then the tip retainer, and the tip retainer has a threaded portion which retains the tip retainer and nozzle tip in the hot runner nozzle.

22. Components for a hot runner nozzle as claimed in claim 21, wherein the tip retainer has a tip retainer threaded portion and the nozzle body has a nozzle body threaded portion that is adapted to mate with the tip retainer threaded portion.

23. Components for a hot runner nozzle as claimed in claim 22, further comprising a nozzle seal piece coupled to an outside surface of the tip retainer, wherein the material of the nozzle seal piece has a thermal conductivity that is less than the thermal conductivity of the material of the tip retainer.

24. Components for a hot runner nozzle as claimed in claim 21, wherein the tip is made from tungsten carbide and the tip retainer is made from beryllium copper or beryllium free copper alloy.

25. Components for a hot runner nozzle as claimed in claim 21, wherein the tip retainer is made from one of TZM, molybdenum or suitable molybdenum alloys, H13, mold steel, or steel alloys.

* * * * *